(12) United States Patent
Ofir

(10) Patent No.: US 12,393,029 B2
(45) Date of Patent: Aug. 19, 2025

(54) BURIED DIFFRACTIVE GRATINGS FOR OPTICAL ELEMENTS OF AUGMENTED REALITY AND VIRTUAL REALITY HEAD-MOUNTED DISPLAYS

(71) Applicant: Adeia Guides Inc., San Jose, CA (US)

(72) Inventor: Yuval Ofir, Kfar Ha-Oranim (IL)

(73) Assignee: ADEIA GUIDES INC., San Jose, CA (US)

( * ) Notice: Subject to any disclaimer, the term of this patent is extended or adjusted under 35 U.S.C. 154(b) by 594 days.

(21) Appl. No.: 17/702,507

(22) Filed: Mar. 23, 2022

(65) Prior Publication Data

US 2023/0305304 A1  Sep. 28, 2023

(51) Int. Cl.
*G02B 27/01* (2006.01)
*B29D 11/00* (2006.01)
(Continued)

(52) U.S. Cl.
CPC .... *G02B 27/0172* (2013.01); *B29D 11/00769* (2013.01); *G02B 1/002* (2013.01);
(Continued)

(58) Field of Classification Search
CPC .. G02B 27/01; G02B 27/017; G02B 27/0101; G02B 27/0172; G02B 27/0176; G02B 27/44; G02B 27/4205; G02B 1/00; G02B 1/02; G02B 1/045; G02B 1/11; G02B 1/11; G02B 1/111; G02B 6/0016; G02B 6/0038; G02B 6/0088; G02B 6/0095; G02B 6/02052; G02B 6/02066; G02B 6/02076; B29D 11/00; B29D 11/0075; B29D 11/00769
See application file for complete search history.

(56) References Cited

U.S. PATENT DOCUMENTS 10,935,730 B1  3/2021  Lou et al.
12,259,554 B2  3/2025  Ofir
(Continued)

FOREIGN PATENT DOCUMENTS

EP  3443402 A1  2/2019
WO  2005024491 A1  3/2005

OTHER PUBLICATIONS

Yin, Kun , et al., "Virtual reality and augmented reality displays: advances and future perspectives", Yin, Kun, et al., "Virtual reality and augmented reality displays: advances and future perspectives." 2021 J. phys. Photonics 3 022010.
(Continued)

*Primary Examiner* — Sultan Chowdhury
(74) *Attorney, Agent, or Firm* — HALEY GUILIANO LLP

(57) ABSTRACT

Head-mounted displays with waveguides comprising buried diffractive gratings and methods for fabricating said waveguides are described herein. In an embodiment, a head-mounted display comprises an optical element and an image source that provides an image beam to an optical element. The optical element comprises a first flat surface, a second flat surface, and a buried diffractive grating spaced from and disposed between the first surface and the second surface. The buried diffractive grating comprises a high-refractive index material interspersed with a low-refractive index material or non-solid pockets, such as gas, air or vacuum.

20 Claims, 9 Drawing Sheets

(51) Int. Cl.
  *G02B 1/00* (2006.01)
  *G02B 1/11* (2015.01)
  *G02B 27/42* (2006.01)
  *G02B 27/44* (2006.01)

(52) U.S. Cl.
  CPC ............ *G02B 1/11* (2013.01); *G02B 27/4205* (2013.01); *G02B 27/44* (2013.01)

(56) References Cited

U.S. PATENT DOCUMENTS

| | | |
|---|---|---|
| 2009/0303565 A1 | 12/2009 | Karmhag et al. |
| 2012/0086949 A1 | 4/2012 | Gao et al. |
| 2018/0081176 A1* | 3/2018 | Olkkonen ................ G02B 6/00 |
| 2018/0299678 A1 | 10/2018 | Singer et al. |
| 2019/0056591 A1* | 2/2019 | Tervo ................... G02B 6/0038 |
| 2019/0339449 A1 | 11/2019 | Shipton et al. |
| 2020/0018875 A1* | 1/2020 | Mohanty ............. H01L 21/3086 |
| 2020/0158942 A1 | 5/2020 | Yang et al. |
| 2020/0285145 A1 | 9/2020 | Watkins et al. |
| 2021/0063634 A1 | 3/2021 | Waldern et al. |
| 2021/0072534 A1 | 3/2021 | Olkkonen et al. |
| 2021/0296859 A1 | 9/2021 | Cheng et al. |
| 2021/0311318 A1* | 10/2021 | Lin ...................... G02B 6/0088 |
| 2021/0318537 A1 | 10/2021 | Kim et al. |
| 2021/0325778 A1 | 10/2021 | Ceballos et al. |
| 2021/0382212 A1* | 12/2021 | Sell ...................... G02B 5/1857 |
| 2022/0019080 A1 | 1/2022 | Schultz |
| 2022/0019081 A1 | 1/2022 | Chien |
| 2022/0137408 A1* | 5/2022 | Bohn ................... G02B 5/1819 345/8 |
| 2022/0146831 A1 | 5/2022 | Deng |
| 2022/0236472 A1* | 7/2022 | Schultz ................ G02B 6/0036 |
| 2022/0357579 A1* | 11/2022 | Drazic ................ G02B 27/0172 |
| 2023/0367046 A1 | 11/2023 | Ofir |
| 2023/0384593 A1 | 11/2023 | Ofir |

OTHER PUBLICATIONS

U.S. Appl. No. 17/825,486, filed May 26, 2022, Yuval Ofir.
U.S. Appl. No. 17/744,936, filed May 16, 2022, Yuval Ofir.

* cited by examiner

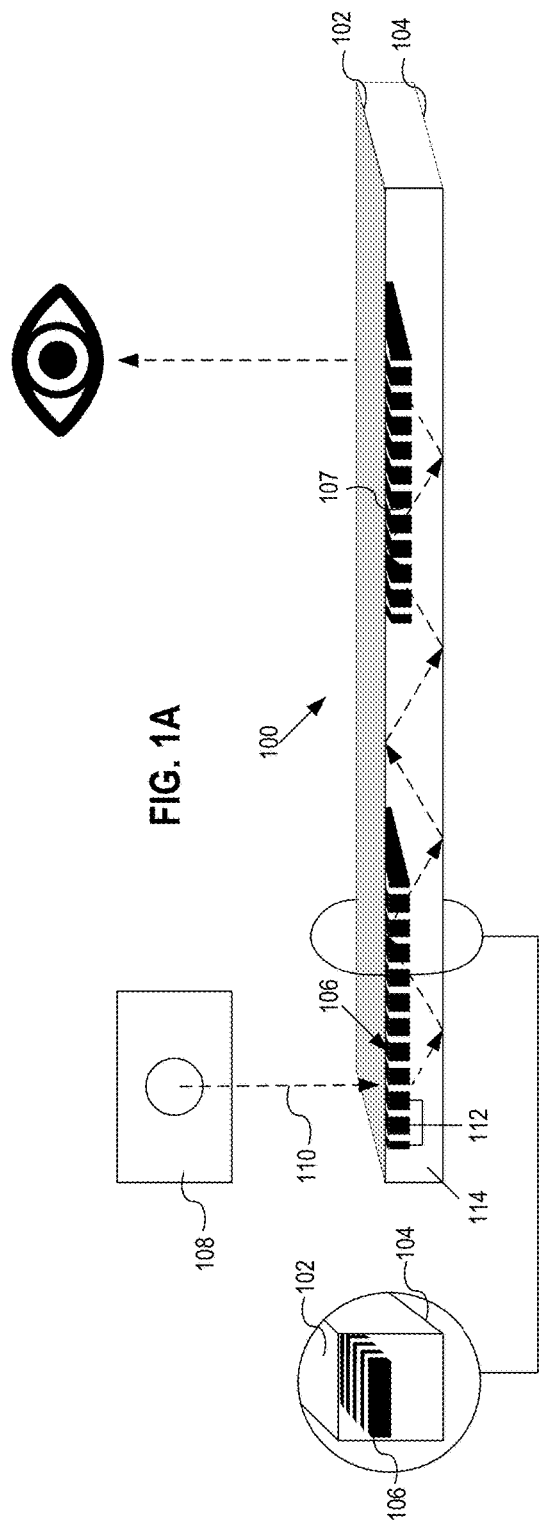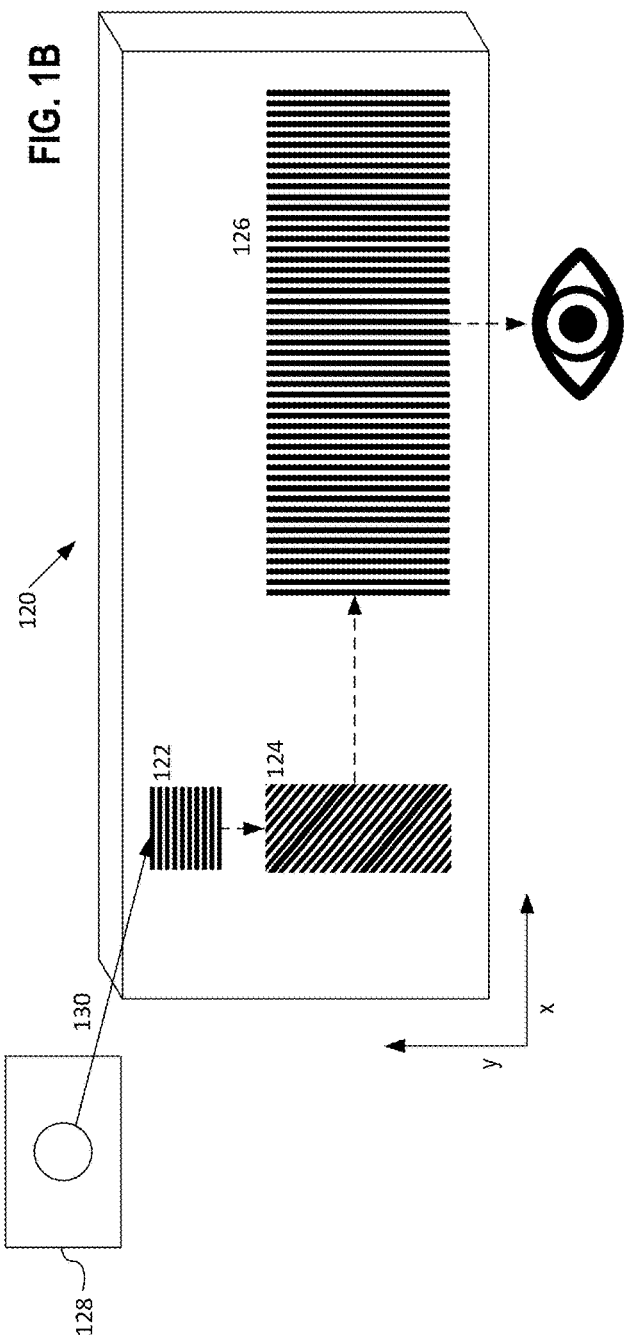

BURIED DIFFRACTIVE GRATINGS FOR OPTICAL ELEMENTS OF AUGMENTED REALITY AND VIRTUAL REALITY HEAD-MOUNTED DISPLAYS

BACKGROUND

This disclosure is generally directed to optical elements. In particular, the present disclosure relates to techniques for fabricating buried diffractive gratings for use in optical equipment (e.g., for optical devices in augmented and virtual reality head-mounted displays) and the resultant waveguides fabricated through said techniques.

SUMMARY

Virtual reality (VR) and augmented reality (AR) systems are becoming increasingly more common in the modern world. A large focus of modern technology is to create head-mounted displays which provide near-eye displays of images. While head-mounted displays have become common for use with VR, head-mounted displays are less popular for AR implementations where their relative bulkiness creates difficulty in everyday environments.

One of the reasons for the excessive bulkiness of head-mounted displays is the optical elements used to create them. In some approaches, head-mounted displays include waveguides made from glass or plastic which diffract light from an image source to an eye of the user. The waveguides may be implemented in lenses of glasses that are attached to the image source. To diffract the light, waveguides include diffractive gratings, such as an input coupler (incoupling) grating and an output coupler (outcoupling) grating. Approaches of gratings used in waveguides include volume Bragg gratings and surface relief gratings.

Volume Bragg gratings are useful in that they provide refractive index modulation, but can be difficult to fabricate as they involve irradiating photosensitive glass with ultraviolet light. Conversely, surface relief gratings can be mass produced with lithographic techniques as they involve creating surface structures that refract incoming light beams.

Surface relief gratings, however, are limited in usability, as they can be extremely fragile. Any additional optical elements that touch the surface relief gratings can damage them. Additionally, any coatings placed on the optical elements can damage the surface relief gratings or ruin their ability to refract light by covering spaces in the structure that need to have a low refractive index. These issues are compounded when combined with head-mounted displays which are often built with multiple waveguides for different frequencies of light. Additionally, for AR usage, people with vision problems may require additional corrective lenses in addition to the waveguides. As waveguides with surface relief gratings include fragile non-flat surfaces, and rely on total internal reflection, the addition of lenses or coatings is not a straightforward process.

To address the aforementioned problem, in one approach, multiple waveguides are mounted in a housing and spaced such that the lenses do not touch each other. If other types of lenses are required, they can also be mounted in the housing such that they do not touch the surface of the waveguides. To further protect the waveguides, the house may have an outer shell that fully surrounds all of the waveguides. While this approach protects the surface relief gratings, the resulting head-mounted display is bulky and cumbersome.

To overcome such deficiencies, head-mounted displays with waveguides comprising buried diffractive gratings and methods for fabricating said waveguides are described herein. In an embodiment, a head-mounted display comprises an optical element and an image source that provides an image beam to an optical element. The optical element comprises a first flat surface, a second flat surface, and a buried diffractive grating spaced from and disposed between the first surface and the second surface. The buried diffractive grating comprises a high-refractive index material interspersed with a low-refractive index material or non-solid pockets, such as gas, air or vacuum.

The high-refractive index material comprises a material with a refractive index above 1.6, such as a high refractive index glass, a high refractive index resin, cubic zirconium oxide, titanium oxide, aluminum oxide, diamond hafnium oxide, tantalum oxide, or zinc oxide. In some embodiments, the refractive index of the high-refractive index material is above is within a range of 1.8-2.1. The low-index material may include any of lithium fluoride, calcium fluoride, magnesium fluoride, or any other low refractive index optical resin. The buried diffractive grating may be used as one or more of an incoupling grating, an outcoupling grating, an expansion grating, or any other diffractive grating used in conjunction with a head-mounted display.

One method of producing the buried diffractive grating in the waveguide comprises patterning a sacrificial material on a surface of a transparent material, such as glass or plastic. The sacrificial material is then coated with a coating comprising a refractive index that is substantially equal to the refractive index of the transparent material, such as cubic zirconium oxide, titanium oxide, aluminum oxide, diamond hafnium oxide, tantalum oxide, or zinc oxide. The sacrificial material is then removed through a process of sintering or dissolution to form nonsolid pockets within the optical waveguide.

Another method of producing the buried diffractive grating in the waveguide comprises patterning a low-index material, such as lithium fluoride, calcium fluoride, magnesium fluoride, or any other low refractive index optical resin, on a surface of a transparent material, such as glass or plastic. The low-index material is then coated with a coating comprising a refractive index that is substantially equal to the refractive index of the transparent material, such as cubic zirconium oxide, titanium oxide, aluminum oxide, diamond hafnium oxide, tantalum oxide, or zinc oxide or a relevant high refractive index resin.

Another method of producing the buried diffractive grating in the waveguide comprises fabricating a grating onto a transparent material, such as through various lithographic techniques. A flat piece of transparent material of a desired thickness is then bonded to the top of the grating, such as through glass laser bonding. An additional processing step may include thinning the flat piece of glass to the desired thickness.

The present disclosure addresses the problems of the fragility of surface relief gratings and the bulkiness caused by using additional optical elements or coatings in addition to optical elements with surface relief gratings. Buried surface relief gratings allow the optical elements to have flat surfaces, thereby allowing the optical elements to be coated with other materials, such as anti-reflective coating or relevant optical coatings, or to subsequently be bonded to other optical elements, such as bonding multiple waveguides together or bonding a waveguide to corrective lenses. Additionally, the buried diffractive gratings fabricated using the techniques described herein can be placed at any depth within the optical element, placed at varying depths within the optical element, and/or fabricated in any of a variety of shapes, spacings, or structures.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1A depicts a diagram of an optical element of a head-mounted display comprising a waveguide with a buried diffractive grating.

FIG. 1B depicts a diagram of a plurality of diffraction gratings of an optical element of a head-mounted display.

DETAILED DESCRIPTION

Figure 2:
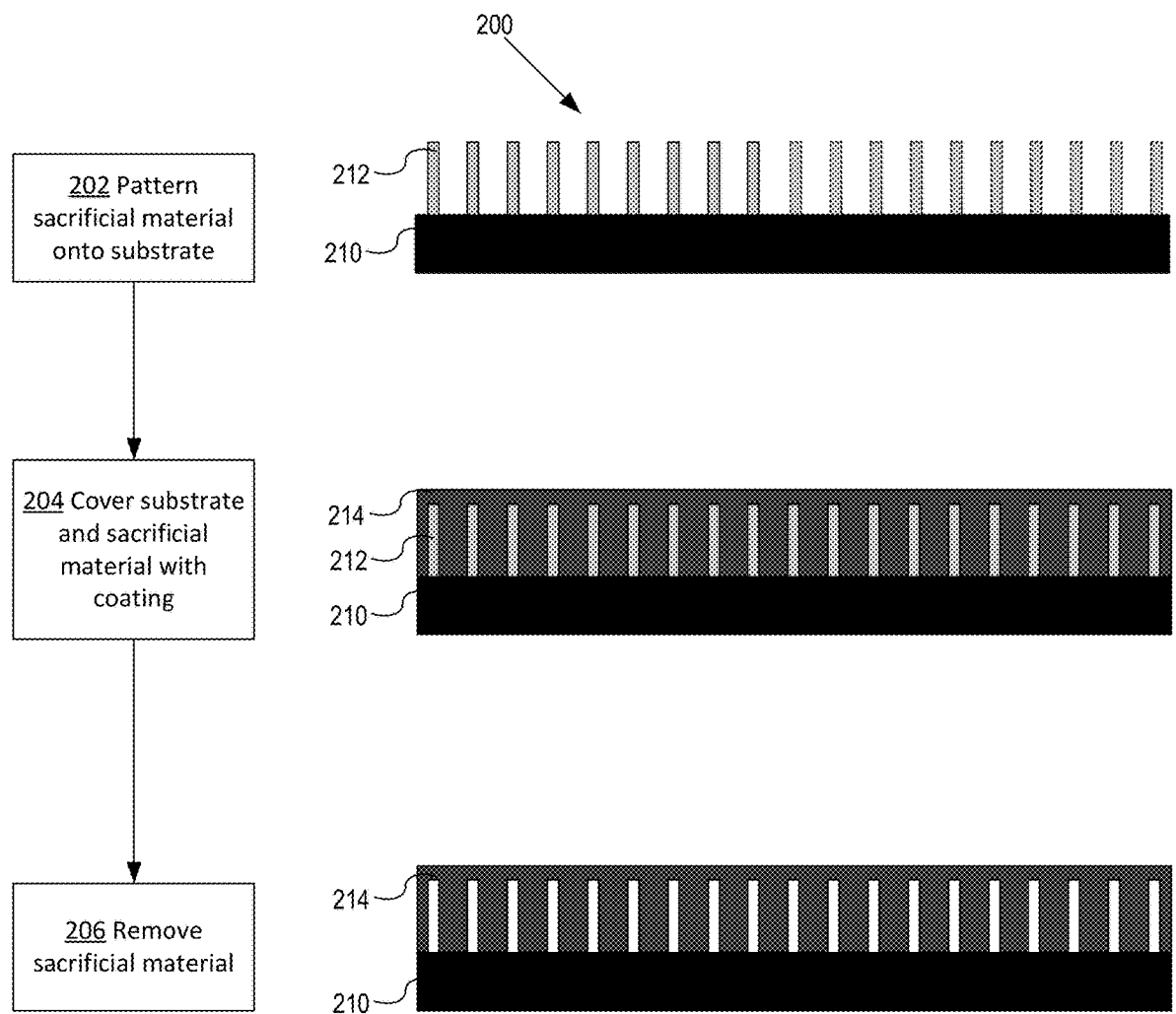
FIG. 2 depicts an example of fabricating a buried diffractive grating in an optical element using sacrificial material.

FIG. 1A depicts a diagram of an optical element of a head-mounted display comprising a waveguide with a buried diffractive grating. Optical element 100 comprises a first flat surface 102 that is substantially parallel to a second flat surface 104. The first flat surface 102 and second flat surface 104 may comprise a same material, such as glass or plastic, or different materials with substantially equal refractive indices. As used herein, a first refractive index is substantially equal to a second refractive index if the refractive indices differ by less than 0.01. In some embodiments, the refractive indices differ by less than 0.001. In some embodiments, the refractive indices differ by less than 0.0001. In some embodiments, the material at the second surface 102 is a glass or plastic and the material at the first surface 104 is a coating that has a refractive index that is substantially equal to the refractive index of the first material.

Optical element 100 comprises a first buried diffractive grating 106 between the first flat surface 102 and the second flat surface 104, such that the buried diffractive grating is spaced from the first surface and the second surface. Methods for creating a buried diffractive grating 106 between the first flat surface 102 and the second flat surface 104 are described further herein. Optical element 100 additionally comprises a second buried diffractive grating 107 between the first flat surface 102 and the second flat surface 104, such that the buried diffractive grating is spaced from the first surface and the second surface. While FIG. 1 depicts both the in-coupling grating and out-coupling grating as buried diffractive gratings, embodiments may include an optical element that comprises a buried diffractive grating as an in-coupling grating, out-coupling grating, expansion grating, or any combination thereof.

As shown in the cross section of buried diffractive grating 106 the buried diffractive gratings each comprise a plurality of pockets 112 of low refractive index material interspaced with high refractive index material 114. The low refractive index material may include solid materials with relatively low refractive indices, such as lithium fluoride, calcium fluoride, magnesium fluoride, or optical resins, or nonsolid pockets, such as pockets of air, vacuum, or gas. The high refractive index material comprises a material that has a refractive index substantially equal to the refractive index of the material of the first surface and/or the second surface. In some embodiments, the high refractive index material is a same material as the first surface and/or second surface, such as glass or plastic. In other embodiments, the high refractive index material is a different material than one or more of the surfaces, such as a coating material. The coating material may comprise any of cubic zirconium oxide, titanium oxide, aluminum oxide, diamond, hafnium oxide, tantalum oxide, zinc oxide, or other high-index resins.

FIG. 1A depicts the buried diffractive grating as a uniform vertical structure of the pockets 112 with even spacing between adjacent pockets by the material 114, which is illustrated as such for the purpose of providing a clear example. FIG. 1-9 are provided as representations of the methods and systems described herein. The elements of FIG. 1-9 are not intended to provide to-scale examples of the methods and systems described herein and embodiments may include different orientations of elements, different sizing of elements, different spacing of elements, or other different configurations of elements. The methods described herein may be used to generate buried diffractive gratings in a variety of different shapes and structures, including blazed structures, slanted structures, binary structures, analogue structures, or varying depth structures. Additionally, the buried diffractive gratings may utilize different types of spacings, such that the low refractive index material and high refractive index material sections have different widths.

An image source 108 provides an image beam to the optical element 100. The image source may comprise a device configured to project an image beam 110 comprising beams of light corresponding to a plurality of pixels that are to be displayed as an image. The image beam 110 is diffracted by the in-coupling grating and guided through the waveguide through total internal reflection across the first flat surface 102 and the second flat surface 104. The image beam is then diffracted by an out-coupling grating to be displayed to an eye of a user. In this manner, the optical element propagates the image beam through the waveguide and directs the image beam through a surface of the waveguide towards an eye of a user, thereby converting the image beam into an image for viewing by the user. While FIG. 1A depicts the image beam 110 being directed out through the same surface as the incoming beam (first flat surface 102), other embodiments of outcoupling gratings may direct the beam out through different surfaces, such as second flat surface 104 or other surfaces of the waveguide.

FIG. 1B depicts a diagram of a plurality of diffraction gratings of an optical element of a head-mounted display. Optical element 120 comprises in-coupling grating 122, expansion grating 124, and out-coupling grating 126. Any of in-coupling grating 122, expansion grating 124, and out-coupling grating 126 may comprise buried diffractive gratings as described herein. While FIG. 1B depicts three diffractive gratings, other embodiments may include more or less diffractive gratings. For example, an optical element may include a plurality of expansion gratings including a first expansion grating that expands the image beam in a first direction and a second expansion grating that expands the image beam in a second direction perpendicular to the first direction.

The image source 128 transmits the image beam 130 into optical element 120 at in-coupling grating 122. In-coupling grating 122 diffracts the image beam along optical element 120 through total internal reflection towards expansion grating 124. Expansion grating 124 comprises a grating configured to expand an incoming beam in the plane of the waveguide. The expansion grating may also be configured to redirect the image beam to another direction. For example, in FIG. 1B, the expansion grating redirects the incoming beam from the x-direction to the y-direction towards the out-coupling grating. The out-coupling grating is configured to diffract the expanded beam towards an eyeball of a wearer of the head-mounted display, such as head-mounted display 900 of FIG. 9. In some embodiments, the out-coupling grating is further configured to expand the image beam, such as in a direction perpendicular to the direction expanded by the expansion grating. Thus, if the expansion grating expands the image beam in the x-direction, the out-coupling grating may be configured to expand the image beam in the y-direction, wherein the z-direction is perpendicular to the optical element in a direction of the user's eye.

FIGS. 2-5 depict different methods of creating buried diffractive gratings for use in optical elements for head-mounted displays. The buried diffractive gratings of FIG. 1 may be generated using any of the methods described in FIGS. 2-5.

FIG. 2 depicts an example of fabricating a buried diffractive grating in an optical element using sacrificial material. Optical element 200 includes substrate 210. Substrate 210 may comprise a material with a high refractive index for fabricating the buried diffractive grating onto, such as glass or plastic. At step 202, sacrificial material 212 is patterned onto the substrate. Sacrificial material 212 may comprise a soluble or dissolvable material, such as a photoresist, a water-soluble polymer or material, or organic-solvent soluble polymer or material. One example of sacrificial material includes water soluble polyvinyl alcohol.

The sacrificial material 212 may be patterned onto substrate 210 in any of a plurality of designs, including blazed patterns, slanted patterns, binary patterns, analogue structures, or varying depth structures. Techniques for patterning sacrificial material 212 onto substrate 210 include any of electron beam lithography, interference lithography, nanoimprint lithography, hot embossing, photolithography, focused ion beams, or any other lithography or patterning techniques.

At step 204, a high index coating 214 is applied to cover sacrificial material 212 and substrate 210. High index coating 214 may comprise any of cubic zirconium oxide, titanium oxide, aluminum oxide, diamond, hafnium oxide, tantalum oxide, zinc oxide, or any other high-index resins. In some embodiments, high index coating 214 is selected to have a refractive index that is substantially equal to the refractive index of substrate 210. Processes for coating the high-index coating onto the sacrificial material 212 and substrate 210 include any of physical vapor deposition, atomic layer deposition, chemical vapor deposition, application of nanoparticle inks, spin casting, or dip-coating.

At step 206, after the high index coating has been applied to cover sacrificial material 212 and substrate 210, the sacrificial material is removed. For example, a sintering or dissolution process may be applied to optical element 200 to remove sacrificial material.

While FIG. 2 depicts the sacrificial material being separately patterned on, other embodiments may include different processes for creating patterns of sacrificial materials on substrate 210. For example, the sacrificial material may be applied to cover optical element 200 in a single layer. A stamp may then be pressed onto the sacrificial material to create the pattern depicted in FIG. 2. While the stamp is in place, ultra-violent nanoimprint lithography or thermal nanoimprint lithography may be used to harden the sacrificial material into place. The stamp may then be removed, thereby leaving a structure with a pattern of sacrificial material similar to the structure made through patterning of sacrificial material. Steps 204 and 206 may then proceed in the same way as described with respect to FIG. 2.

Figure 3:
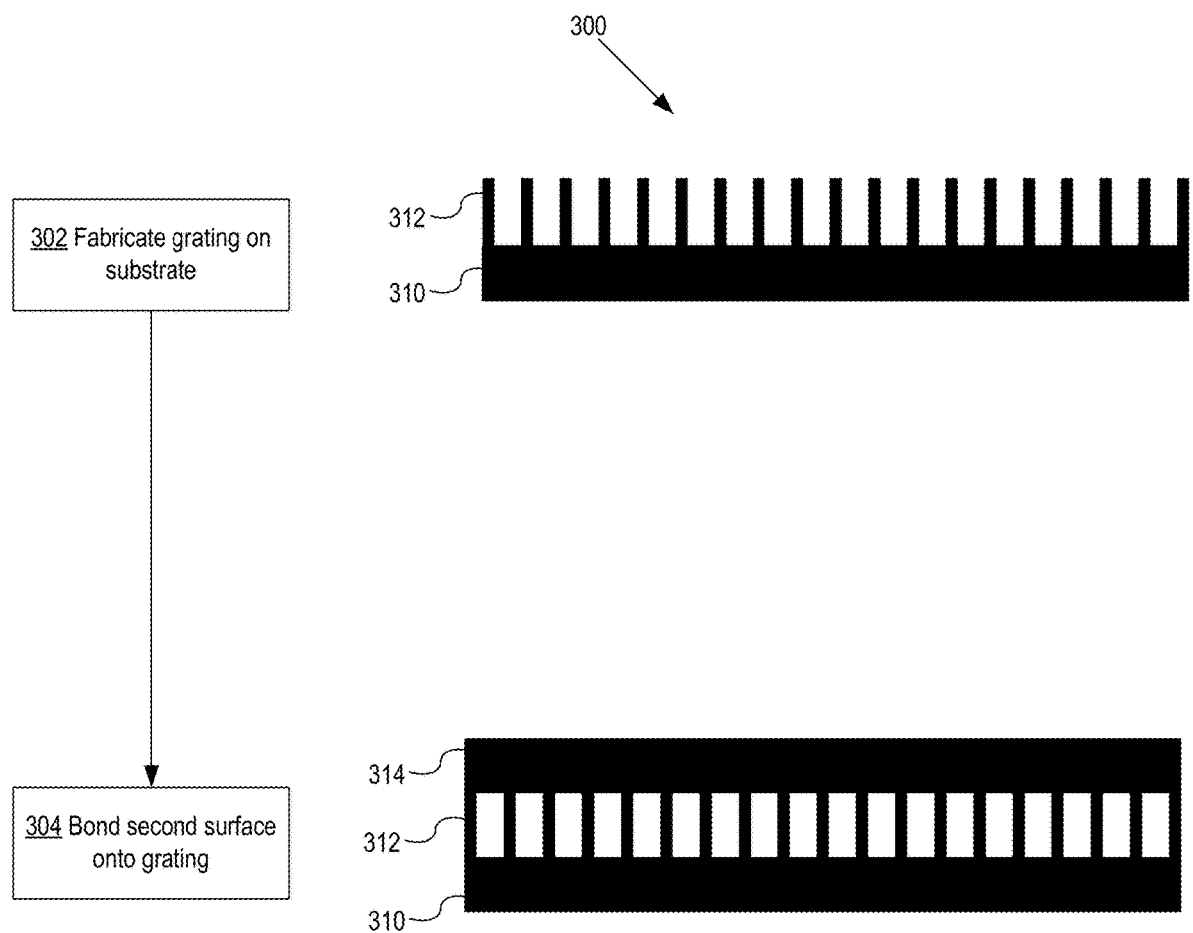
FIG. 3 depicts an example of fabricating a buried diffractive grating in an optical element using direct laser bonding.

FIG. 3 depicts an example of fabricating a buried diffractive grating in an optical element using laser bonding. Optical element 300 includes substrate 310. Substrate 310 may comprise a material with a high refractive index for fabricating the buried diffractive grating onto, such as glass or plastic. At step 302, grating 312 is fabricated onto substrate 310. For example, a standard surface relief grating may be fabricated onto the surface of substrate 310, such as through laser etching/ablation.

At step 304, a second surface 314 is bonded onto the grating to generate a buried diffractive grating via laser direct bonding in an adhesive-free process. The second surface 314 may comprise a material with a substantial equal refractive index as the first material. In some embodiments, the second surface 314 is a same material as substrate 310. For example, both materials may be glass with a same refractive index. The second surface may be attached to the first surface and grating through any bonding techniques, such as direct glass laser bonding.

Figure 4:
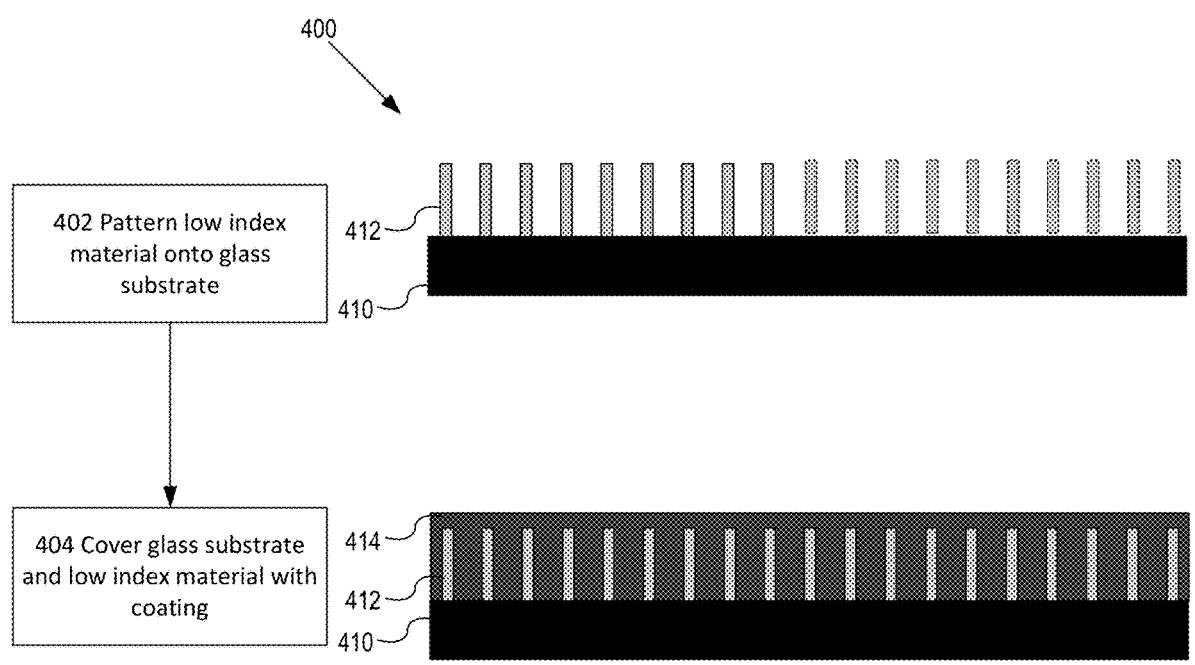
FIG. 4 depicts an example of fabricating a buried diffractive grating in an optical element using a low-refractive index material.

FIG. 4 depicts an example of fabricating a buried diffractive grating in an optical element using a low-refractive index material. Optical element 400 includes substrate 410. Substrate 410 may comprise a material with a high refractive index for fabricating the buried diffractive grating onto, such as glass or plastic. At step 402, a low index material 412 is patterned onto the substrate. Low index material 412 may comprise a material with a refractive index that is substantially lower than the refractive index of substrate 410, such as lithium fluoride, calcium fluoride, magnesium fluoride, or any other low refractive index optical resin. Substantially lower, as used herein, refers to a difference of 0.5 or greater between the two indices.

The low index material 412 may be patterned onto substrate 410 in any of a plurality of designs, including blazed patterns, slanted patterns, binary patterns, analogue structures, or varying depth structures. Techniques for patterning low index material 412 onto substrate 410 include any of electron beam lithography, interference lithography, nanoimprint lithography, hot embossing, photolithography with a pattern transfer, reactive ion etching and deposition of the low index material, or any other lithography or patterning techniques.

At step 404, a high index coating 414 is applied to cover low index material 412 and substrate 410. High index coating 414 may comprise any of cubic zirconium oxide, titanium oxide, aluminum oxide, diamond, hafnium oxide, tantalum oxide, zinc oxide, or any other high-index resins. In some embodiments, high index coating 414 is selected to have a refractive index that is substantially equal to the refractive index of substrate 410. Processes for coating the high-index coating onto the low index material 412 and substrate 410 include any of physical vapor deposition, atomic layer deposition, chemical vapor deposition, application of nanoparticle inks, spin casting, or dip-coating.

The fabrication techniques described herein with respect to FIG. 2-4 provide a wide array of benefits. One such benefit is that buried diffractive gratings can be fabricated in different structures within the optical element, such as blazed structures, slanted structures, binary structures, analogue structures, or varying depth structures. In particular, varying depth structures are not possible with surface relief gratings. In contrast, buried diffractive gratings can be fabricated at different depths depending on need, with some embodiments including buried diffractive gratings in a center of the optical element and other embodiments including buried diffractive gratings closer to one surface of the optical element than the other. In addition, a single diffractive grating can be fabricated with portions of the buried diffractive grating at different depths and/or different buried diffractive gratings in a single optical element can be fabricated at different depths, such as an in-coupling grating at a first depth and an out-coupling grating at a second depth.

Figure 5:
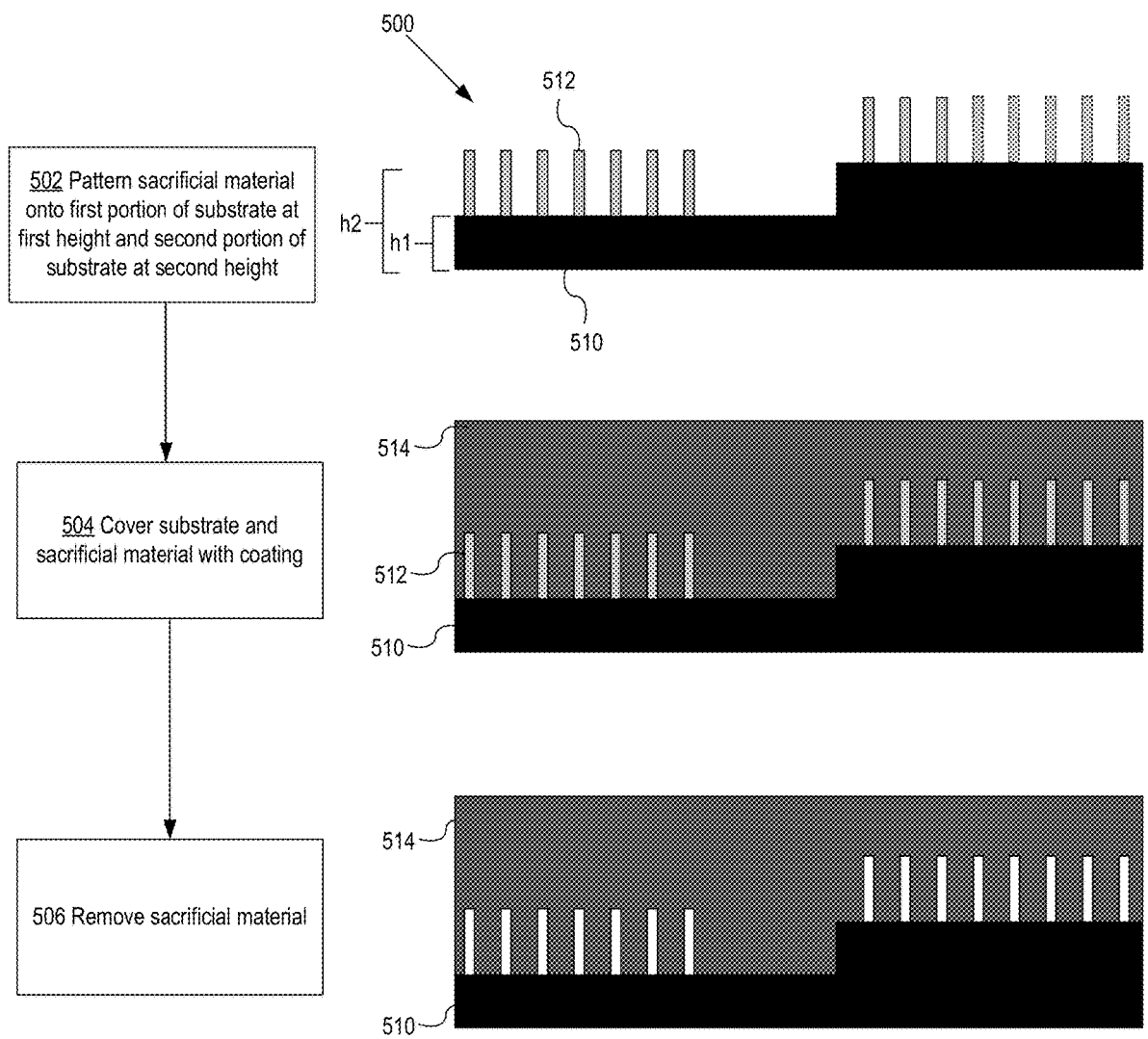
FIG. 5 depicts an example of fabricating a buried diffractive grating at multiple depths in an optical element.

FIG. 5 depicts an example of fabricating a buried diffractive grating at multiple positional depths in an optical element. Optical element 500 includes substrate 510 at a plurality of varying heights. For instance, in FIG. 5, a first portion of substrate 510 comprises an initial height relative to a bottom surface of h1 while a second portion of substrate 510 comprises an initial height relative to the bottom surface of h2. Substrate 510 may comprise a material with a high refractive index for fabricating the buried diffractive grating onto, such as glass or plastic. Substrate 510 may be fabricated to have varying heights through bonding of multiple pieces of substrate, such as laser bonding of glass, and/or through removal of a portion of the substrate, such as by laser etching or other glass cutting processes. The varying heights may be fabricated in a location designated for a single buried diffractive grating and/or in locations for different buried diffractive gratings such that a first location is a first height and a second location is a second height.

At step 502, sacrificial material 512 is patterned onto the substrate at the plurality of varying heights. For instance, sacrificial material 512 is patterned onto the first portion of substrate 510 at height h1 and the second portion of substrate 510 at height h2. Sacrificial material 512 may comprise a soluble or dissolvable material, such as a photoresist, a water-soluble polymer or material, or organic-solvent soluble polymer or material. One example of sacrificial material includes water soluble polyvinyl alcohol.

The sacrificial material 512 may be patterned onto substrate 510 in any of a plurality of designs, including blazed patterns, slanted patterns, binary patterns, analogue structures, or varying depth structures. Techniques for patterning sacrificial material 512 onto substrate 510 include any of electron beam lithography, interference lithography, nanoimprint lithography, hot embossing, photolithography, focused ion beams, or any other lithography or patterning techniques.

At step 504, a high index coating 514 is applied to cover sacrificial material 512 and substrate 510. High index coating 514 may comprise any of cubic zirconium oxide, titanium oxide, aluminum oxide, diamond, hafnium oxide, tantalum oxide, zinc oxide, or any other high-index resins. In some embodiments, high index coating 514 is selected to have a refractive index that is substantially equal to the refractive index of substrate 510. Processes for coating the high-index coating onto the sacrificial material 512 and substrate 510 include any of physical vapor deposition, atomic layer deposition, chemical vapor deposition, application of nanoparticle inks, spin casting, or dip-coating.

At step 506, after the high index coating has been applied to cover sacrificial material 512 and substrate 510, the sacrificial material is removed. For example, a sintering or dissolution process may be applied to optical element 500 to remove sacrificial material.

Figure 6:
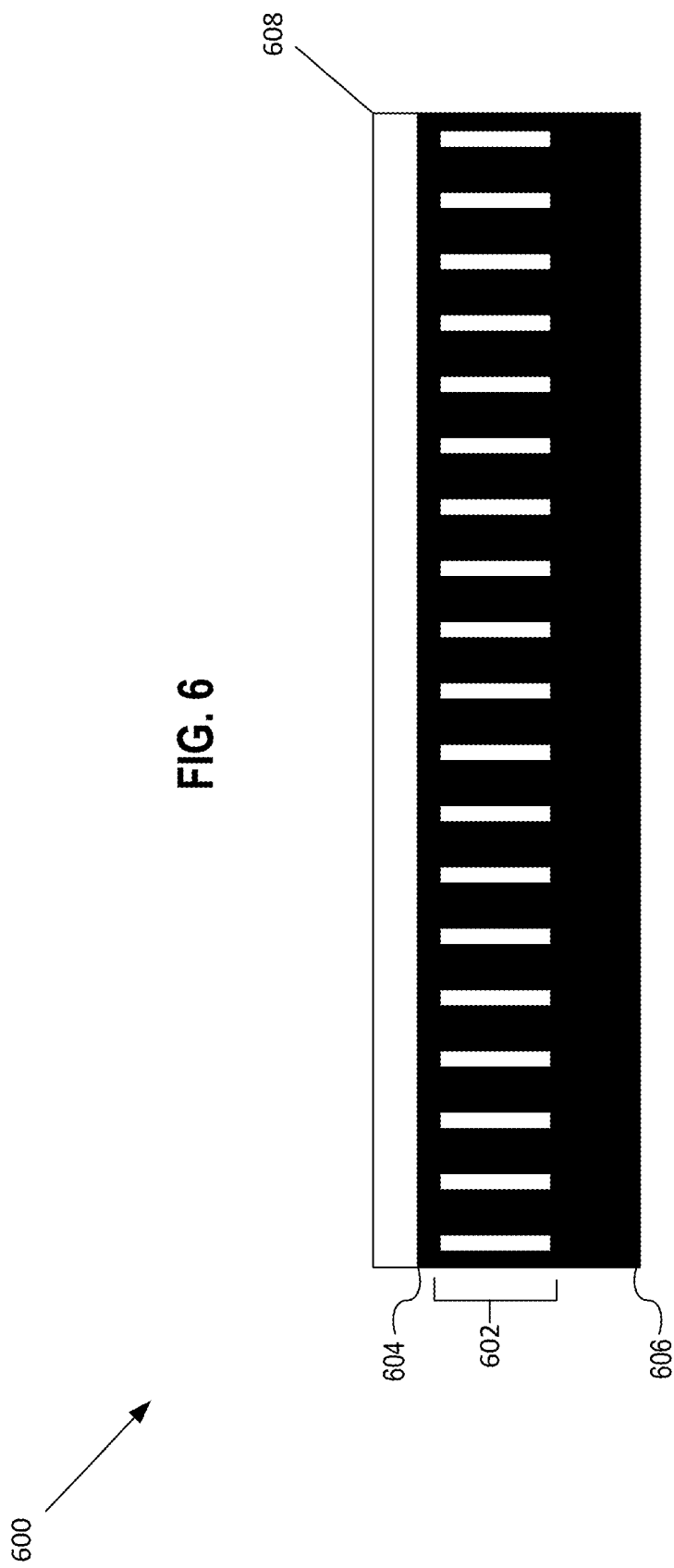
FIG. 6 depicts an optical element comprising a buried diffractive grating and an additional coating.

Another benefit of the fabrication techniques described herein is that the resultant buried diffractive grating is separated from the surface of the optical element, thereby protecting the buried diffractive grating and allowing additional coatings or layers to be added to the optical element. FIG. 6 depicts an optical element comprising a buried diffractive grating and an additional coating. Optical element 600 comprises buried diffractive grating 602, surface 604, and surface 606. Surface 604 and surface 606 comprise substantially flat surfaces that are substantially parallel to each other. Surface 604 and surface 606 may comprise a same material, such as glass or plastic, or different materials, such as glass with a high-refractive index coating that has a substantially equal refractive index to the glass. Additional coating 608 comprises a material that is used to coat surface 604 after fabrication of the buried diffractive grating and/or is coated on top of an angular-sensitive reflective coating which is coated on top of the surface. Additional coating may comprise a wax or polish, an anti-reflective coating, such as magnesium fluoride, a high-reflection coating, such as a combination of zinc sulfide or titanium dioxide with magnesium fluoride or silicon dioxide, a transparent conductive coating, such as indium tin oxide, or any other coating material.

In some embodiments, a coating is used to provide a pseudo-air layer between different types of lenses. The coating may comprise an angular-sensitive reflective coating that maintain operation of the waveguide at the angles at which light is expected to strike the surface based on the diffractive gratings. The angular-sensitive layer effectively isolates the waveguide operation at the relevant angles allowing other optical elements to be attached to the surface over the coating. Examples of additional optical elements include ophthalmic lenses, photochromic or electrochromic lenses, dynamic or active operated lenses, polarized lenses, or other lenses. In some embodiments, the angular-sensitive reflective coating is used in conjunction with the additional coatings described above, such that the pseudo-air layer is placed between the optical element and the additional coating.

Figure 7:
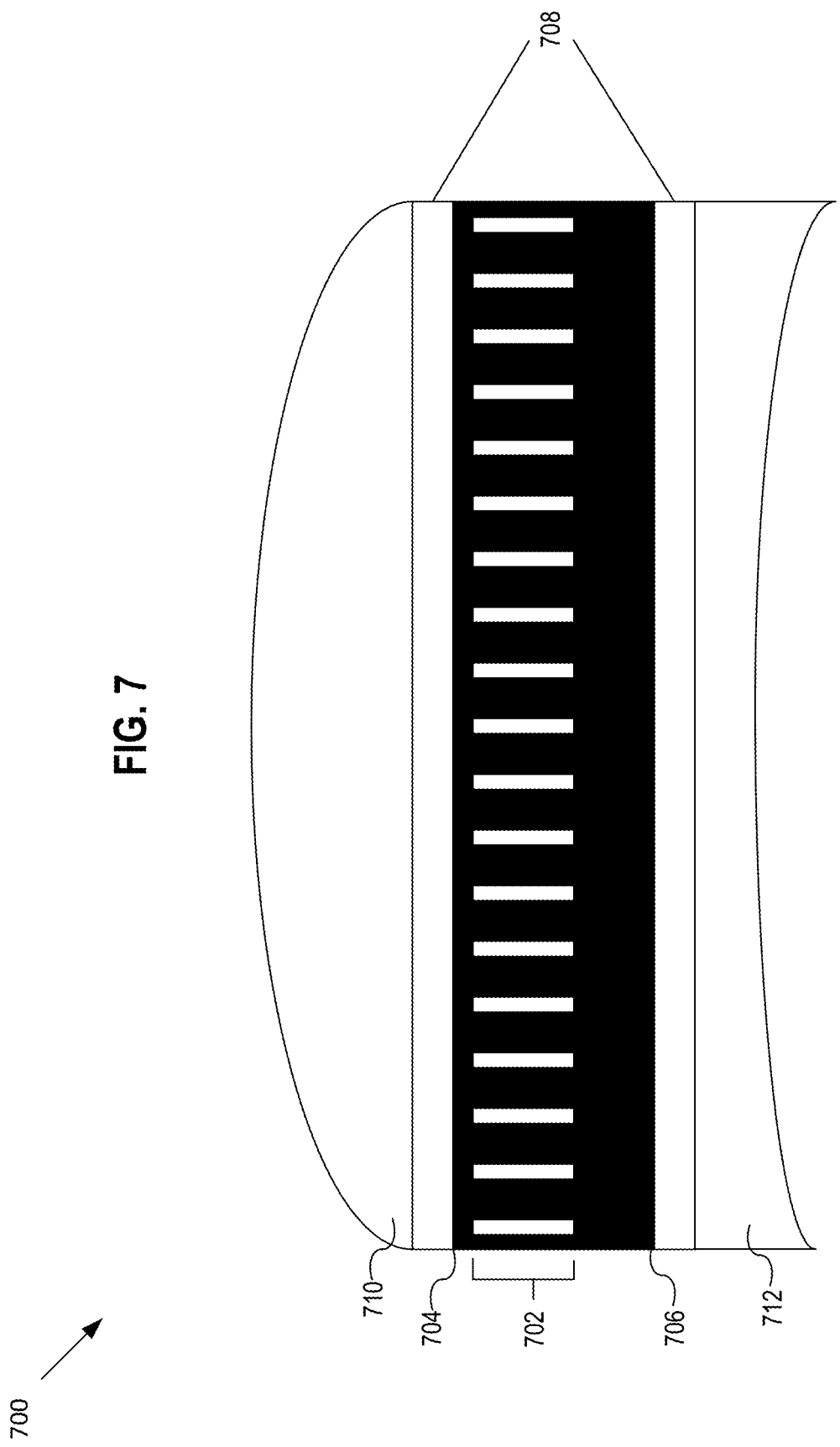
FIG. 7 depicts an optical element comprising a buried diffractive grating and additional coatings that allow other optical elements to be attached to the optical element comprising the buried diffractive grating.

FIG. 7 depicts an optical element comprising a buried diffractive grating and additional coatings that allow other optical elements to be attached to the optical element comprising the buried diffractive grating. Optical element 700 comprises buried diffractive grating 702, surface 704, and surface 706. Surface 704 and surface 706 comprise substantially flat surfaces that are substantially parallel to each other. Surface 704 and surface 706 may comprise a same material, such as glass or plastic, or different materials, such as glass with a high-refractive index coating that has a substantially equal refractive index to the glass. Each of surface 704 and surface 706 is coated with an angular sensitive coating to provide pseudo-air layer 708. The pseudo-air layer 708 allows the waveguide to continue to operate as if surface 704 and surface 705 were surrounded with a substance with a low refractive index, such as air or gas.

Convex lens 710 and concave lens 712 comprise two examples of ophthalmic lenses that may be used in conjunction with optical element 700 that are attached to the flat surface of optical element 700 on the pseudo-air layer 708 made up of the angular-sensitive coating. Convex lens 710 comprises a lens with a rounded surface and a flat surface which is separated from surface 704 by pseudo-air layer 708. Similarly, concave lens 712 comprises a lens with a rounded surface and a flat surface which is separated from surface 706 by pseudo-air layer 708. Other embodiments may include a single optical element attached to optical element 700 and separated by pseudo-air layer 708. Additionally, embodiments may include different types of optical elements attached to optical element 700 and separated by pseudo-air layer 708, such as photochromic or electrochromic lenses, actively operated lenses, polarized lenses, or other lenses.

Figure 8:
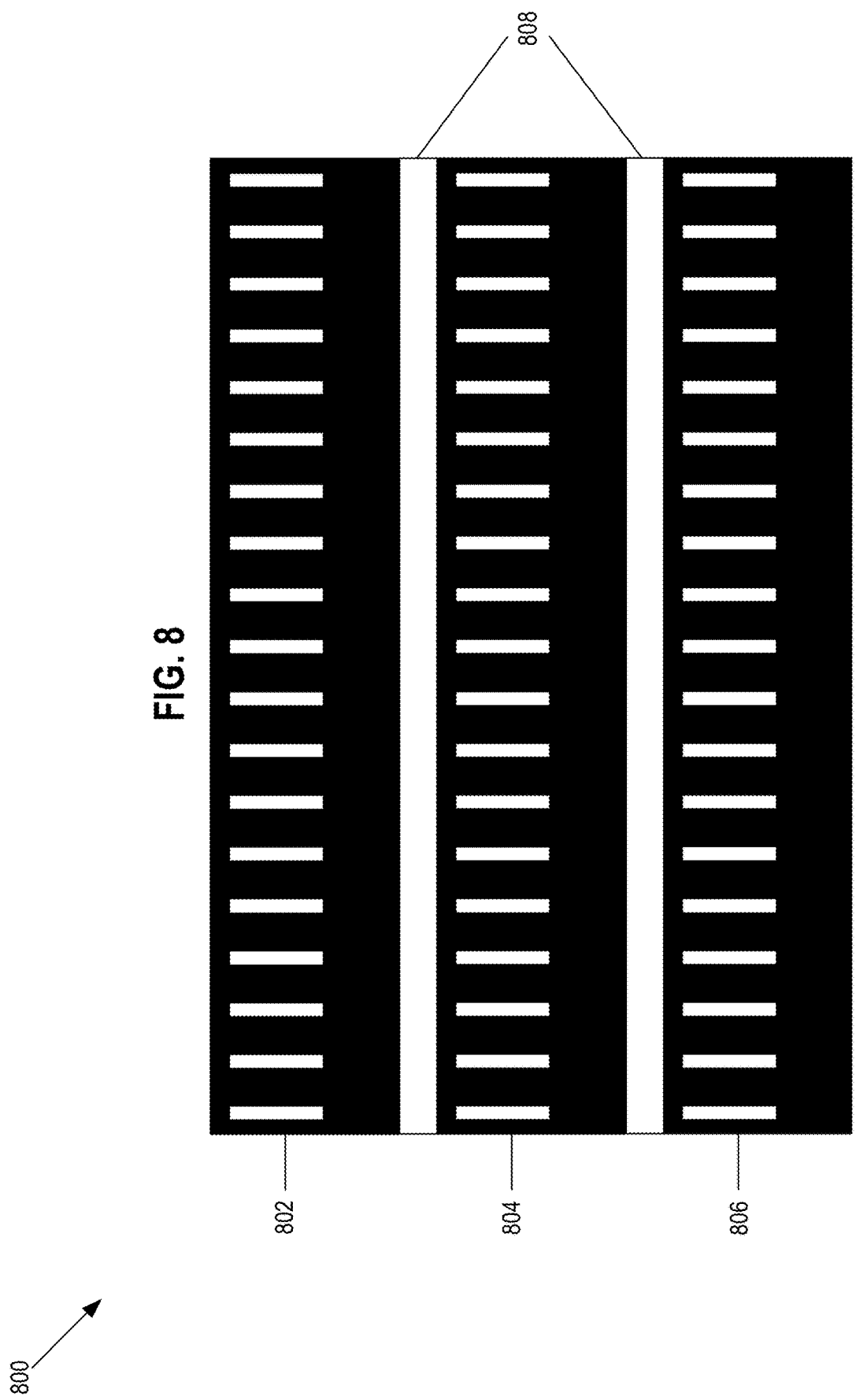
FIG. 8 depicts an example of a plurality of stacked optical elements with buried diffractive gratings.

In some embodiments, an angular sensitive coating is used to separate waveguides comprising buried diffractive gratings. The use of the buried diffractive gratings allows the waveguides to be stacked on top of each other, thereby creating a compact set of waveguides which can be used to provide a plurality of images, such as images at different focal points or images at different frequencies. FIG. 8 depicts an example of a plurality of stacked optical elements with buried diffractive gratings. While FIG. 3 depicts three stacked optical elements for the purpose of providing a clear example, other embodiments may include fewer or more stacked optical elements. Additionally, while FIG. 3 depicts optical elements for different wavelengths, the combination of optical elements described herein may be used with other types of optical elements, such as optical elements for different focal points. The combination of waveguides described with respect to FIG. 8 may additionally be combined with other embodiments, including additional lenses, such as the ophthalmic lenses of FIG. 7, or other types of coatings, such as anti-reflective coatings.

Optical element combination 800 comprises three optical elements 802, 804, and 806 separated by an angular sensitive pseudo-air layer coating 808. Each of optical elements 802, 804, and 806 comprise buried diffractive gratings. While the buried diffractive gratings in FIG. 8 are depicted as being equivalent, other embodiments may include buried diffractive gratings with different structures, at different depths, and/or with different spacings. Each of optical elements 802, 804, and 806 are configured to diffract image beams of different wavelengths. For example, optical element 802 may comprise a waveguide configured to diffract an image beam with a wavelength of 465 nm, optical element 804 may comprise a waveguide configured to diffract an image beam with a wavelength of 530 nm, and optical element 806 may comprise a waveguide configured to diffract an image beam with a wavelength of 630 nm. Thus, a head-mounted display may provide each of the image beams to the different waveguides, thereby providing a full color image to an eye of a viewer.

Figure 9:
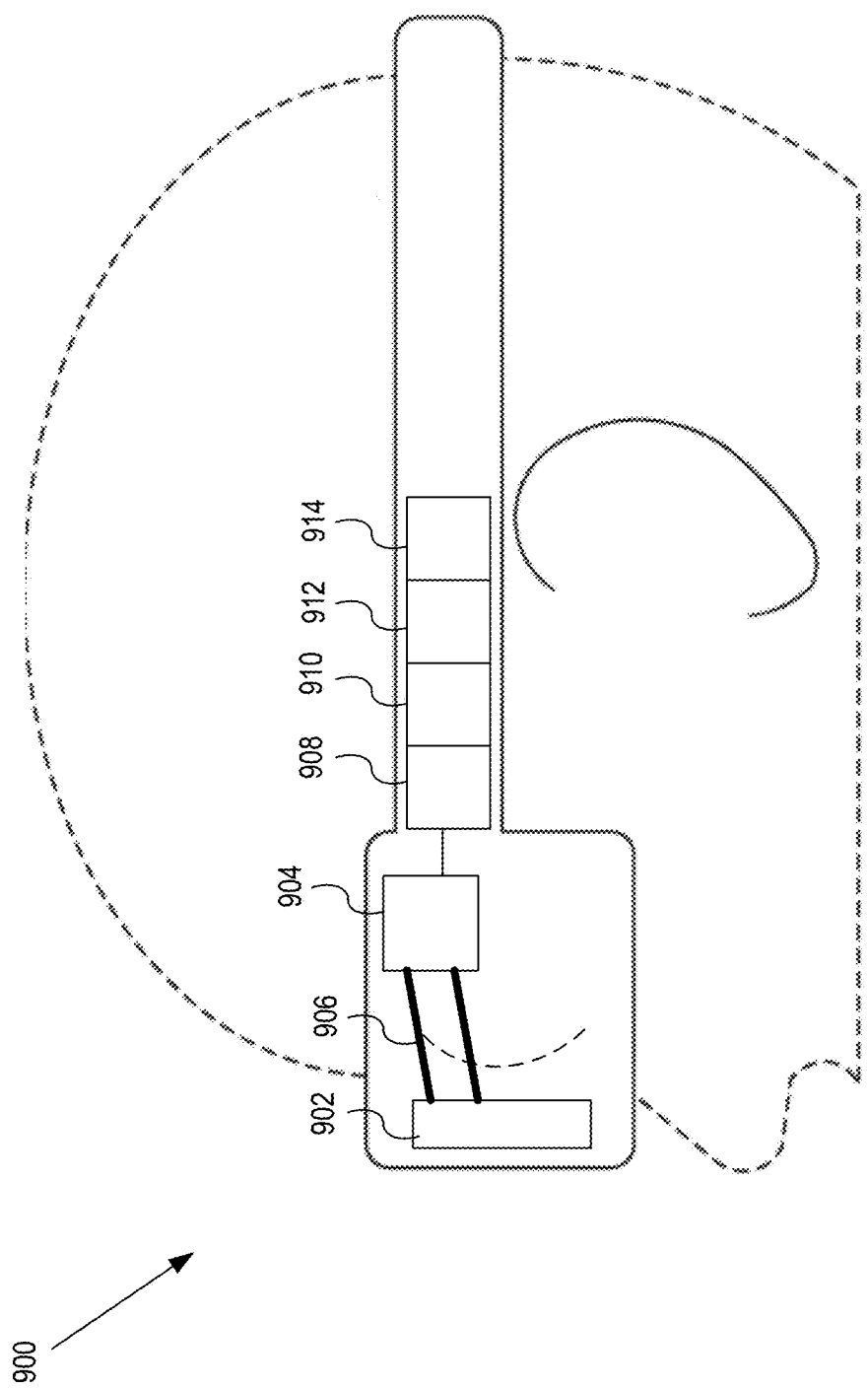
FIG. 9 depicts an example of a head-mounted display comprising one or more optical elements with a buried diffractive grating.

FIG. 9 depicts an example of a head-mounted display comprising one or more optical elements with a buried diffractive grating. Head-mounted display 900 comprises optical element 902, image source 904, control circuitry 908, memory 910, network adaptor 912, and power source 914. Optical element 902 comprises an optical element, such as a lens, which sits in front of an eye of a user. Image source 904 provides an image beam 906 to the optical element which is diffracted by a buried diffractive grating and displayed to the eye of the user. Control circuitry 908 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., quad-core). Control circuitry 908 may be configured to generate one or more images for display through the head-mounted display and instruct image source 904 to produce one or more image beams corresponding to the one or more images. Memory 910 may be any device for storing electronic data, such as random-access memory, solid state devices, quantum storage devices, hard disk drives, non-volatile memory or any other suitable fixed or removable storage devices, and/or any combination of the same. Memory 910 may store data defining images for display by the head-mounted display. Network adaptor 912 comprises circuitry that connects the head-mounted display to one or more other devices over a network. Network adaptor 912 may comprise wires and/or busses connected to a physical network port, e.g. an ethernet port, a wireless WiFi port, cellular communication port, or any other type of suitable physical port. Power source 914 comprises a source of power to the image source 904, control circuitry 908, memory 910, and/or network adaptor 912, such as a battery, solar generator, or wired power source.

What is claimed is:

1. A head-mounted display, comprising:
an image source configured to provide an image beam;
an optical element comprising a flat first surface, a flat second surface opposing the first surface, and a buried diffractive grating spaced from and disposed between the first surface and the second surface, the buried diffractive grating comprising a plurality of nonsolid pockets interspaced with a material, wherein the material has a refractive index that is substantially equal to a refractive index of the first surface and a refractive index of the second surface;
wherein the optical element is configured to convert the image beam into an output image by diffracting the beam through the buried diffractive grating, propagating the image beam through the optical element through reflection off the first and second surfaces, and directing the image beam through at least one of the first or second surfaces of the optical element.

2. The head-mounted display of claim 1, further comprising a lens coupled to the optical element, wherein the lens is separated from the first surface by an angular-sensitive reflective coating.

3. The head-mounted display of claim 1, wherein the optical element is a first optical element, the buried diffractive grating is a first buried diffractive grating, and the head-mounted display further comprises:
a second optical element comprising a third surface, a fourth surface opposing the third surface, and a second buried diffractive grating spaced from and disposed between the third surface and the fourth surface;
wherein the fourth surface of the second optical element is separated from the first surface of the first optical element by an angular-sensitive reflective coating;
wherein the image source is configured to provide a first image beam at a first wavelength to the first optical element and a second image beam at a second wavelength to the second optical element.

4. The head-mounted display of claim 1, wherein the optical element is a first optical element, the buried diffractive grating is a first buried diffractive grating, and the head-mounted display further comprises:
a second optical element comprising a third surface, a fourth surface opposing the third surface, and a second buried diffractive grating spaced from and disposed between the third surface and the fourth surface;

wherein the fourth surface of the second optical element is separated from the first surface of the first optical element by an angular-sensitive reflective coating;

wherein the first optical element is configured to output the image at a first focus and the second optical element is configured to output the image at a second focus.

5. The head-mounted display of claim 1, wherein the buried diffractive grating comprises two or more of an incoupling grating, an outcoupling grating, or an expansion grating.

6. The head-mounted display of claim 1, wherein the optical element is configured to convert the image beam into an image by:
receiving the image beam at an incoupling grating of the optical element which diffracts the image beam towards an expansion grating of the optical element;
expanding the image beam by the expansion grating of the optical element and transmitting the beam from the expansion grating to an outcoupling grating;
diffracting the expanded image beam by the outcoupling grating towards an eyeball of a wearer of the head-mounted display.

7. The head-mounted display of claim 1, wherein the material comprises a coating of one or more of cubic zirconium oxide, titanium oxide, aluminum oxide, diamond hafnium oxide, tantalum oxide, or zinc oxide, and wherein the first surface comprises the coating.

8. The head-mounted display of claim 1, wherein the material comprises glass of the first surface.

9. The head-mounted display of claim 1, wherein the buried diffractive grating comprises a first grating and a second grating, wherein the first grating is spaced closer to the first surface than the second grating.

10. The head-mounted display of claim 1, wherein the plurality of nonsolid pockets comprise of gas surrounded by solid material.

11. A method for producing a waveguide for a head-mounted display comprising:
patterning a sacrificial material on a surface of transparent material;
coating the sacrificial material with a coating comprising a refractive index substantially equal to a refractive index of the transparent material;
performing sintering of the sacrificial material to form nonsolid pockets in place of the sacrificial material.

12. The method of claim 11, wherein the transparent material is disposed at a plurality of heights, and wherein patterning the sacrificial material on the surface of the transparent material comprises patterning a first portion of the sacrificial material at a first height and patterning a second portion of the sacrificial material at a second height.

13. The method of claim 11, wherein the sacrificial material comprises one or more of a photoresist, a water-soluble material, or organic-solvent soluble material.

14. The method of claim 11, wherein the coating comprises one or more of cubic zirconium oxide, titanium oxide, aluminum oxide, diamond hafnium oxide, tantalum oxide, or zinc oxide.

15. The method of claim 11, wherein the sintering of the sacrificial material results in creation of gas packets surrounded by solid material.

16. A waveguide for a head-mounted display produced by:
patterning a sacrificial material on a surface of a transparent material;
coating the sacrificial material with a coating comprising a refractive index substantially equal to a refractive index of the transparent material;
performing sintering of the sacrificial material to form a plurality of pockets of nonsolid pockets in place of the sacrificial material.

17. The waveguide of claim 16, wherein the transparent material comprises glass or plastic.

18. The waveguide of claim 16, wherein the transparent material is disposed at a plurality of heights, and wherein patterning the sacrificial material on the surface of the transparent material comprises patterning a first portion of the sacrificial material at a first height and patterning a second portion of the sacrificial material at a second height.

19. The waveguide of claim 16, wherein the sacrificial material comprises one or more of a photoresist, a water-soluble material, or organic-solvent soluble material.

20. The waveguide of claim 16, wherein the sintering of the sacrificial material results in gas packets surrounded by solid material.

* * * * *